United States Patent
Kim et al.

(10) Patent No.: US 9,250,835 B2
(45) Date of Patent: Feb. 2, 2016

(54) IMAGE FORMING APPARATUS CONNECTABLE TO MULTIPLE HOSTS AND METHOD OF CONTROLLING IMAGE FORMING JOBS OF THE IMAGE FORMING APPARATUS

(71) Applicant: Samsung Electronics Co., Ltd., Suwon-si (KR)

(72) Inventors: Ji-won Kim, Yongin-si (KR); Hoe-go Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 359 days.

(21) Appl. No.: 13/666,185

(22) Filed: Nov. 1, 2012

(65) Prior Publication Data

US 2013/0170121 A1    Jul. 4, 2013

(30) Foreign Application Priority Data

Dec. 30, 2011    (KR) .................. 10-2011-0147435

(51) Int. Cl.
*G06F 9/46* (2006.01)
*G06F 3/12* (2006.01)

(52) U.S. Cl.
CPC ............ *G06F 3/1206* (2013.01); *G06F 3/1236* (2013.01); *G06F 3/1247* (2013.01); *G06F 3/1284* (2013.01)

(58) Field of Classification Search
None
See application file for complete search history.

(56) References Cited

U.S. PATENT DOCUMENTS

| 2006/0123166 A1* | 6/2006 | Toebes et al. | 710/106 |
| 2007/0245057 A1 | 10/2007 | Bohm et al. | |
| 2008/0024815 A1* | 1/2008 | Oak | 358/1.15 |
| 2009/0303521 A1* | 12/2009 | Kumar | 358/1.15 |
| 2010/0122010 A1 | 5/2010 | Yan | |
| 2012/0075213 A1* | 3/2012 | Huang et al. | 345/173 |
| 2013/0083347 A1* | 4/2013 | Perez et al. | 358/1.14 |

FOREIGN PATENT DOCUMENTS

KR    10-2007-0000682    1/2007

OTHER PUBLICATIONS

Extended European Search Report issued Dec. 13, 2013 in European Patent Application No. 12195504.1.
"Installation Guide USB Auto Printer Sharing Switch", XP055091772, Feb. 2009, 30 pages.

* cited by examiner

*Primary Examiner* — Kenneth Tang
(74) *Attorney, Agent, or Firm* — Staas & Halsey LLP

(57) ABSTRACT

An image forming apparatus connectable to multiple hosts includes a plurality of USB interfaces to connect with the respective multiple hosts to receive job request data for image forming jobs requested by the multiple hosts; a driver module to process the job request data received via the respective multiple USB interfaces; a USB data manager to generate job data that corresponds to each of types of the requested image forming jobs by using the processed job request data; and a main controller to control the image forming apparatus to perform the image forming jobs based on the generated job data.

18 Claims, 8 Drawing Sheets

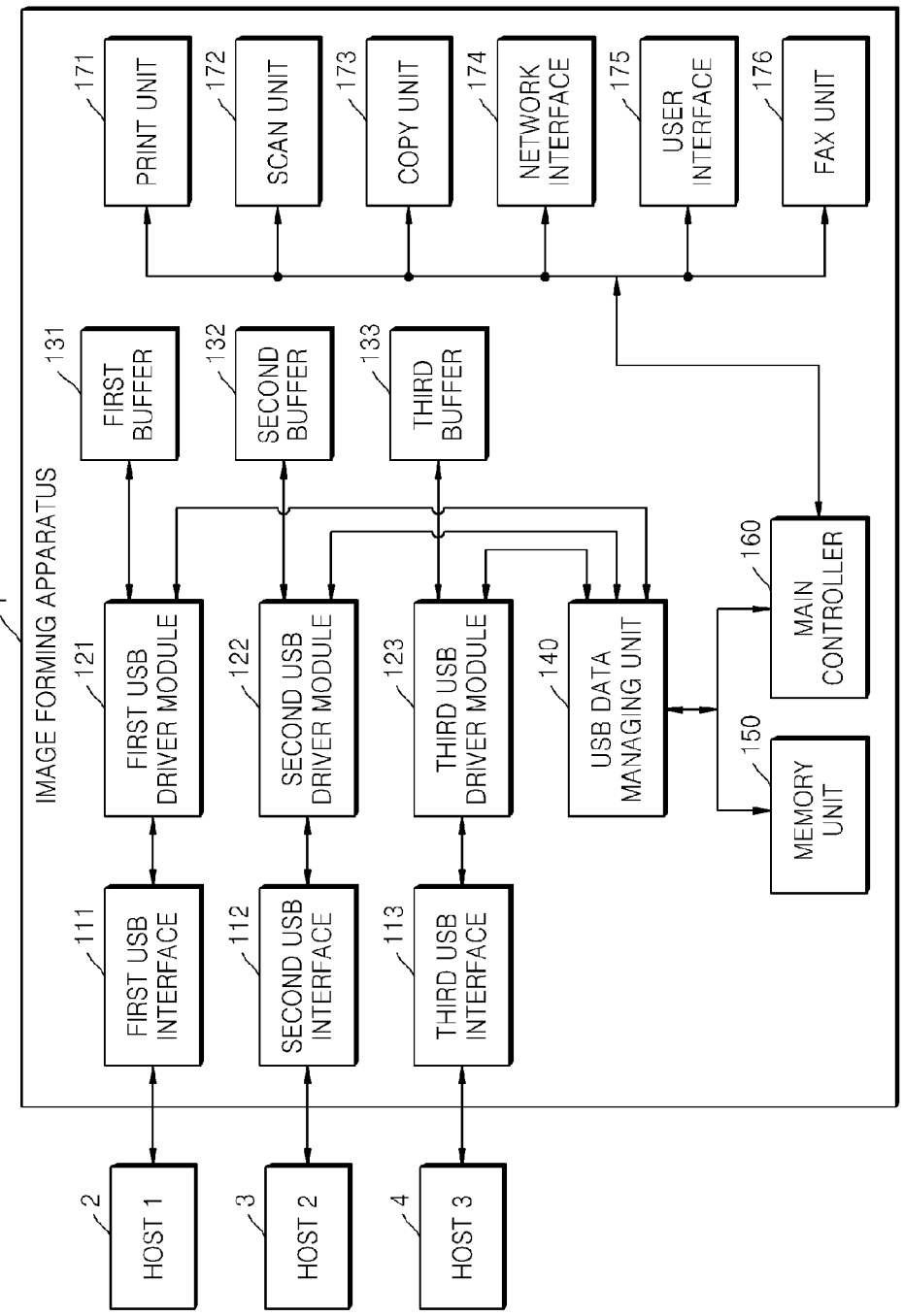

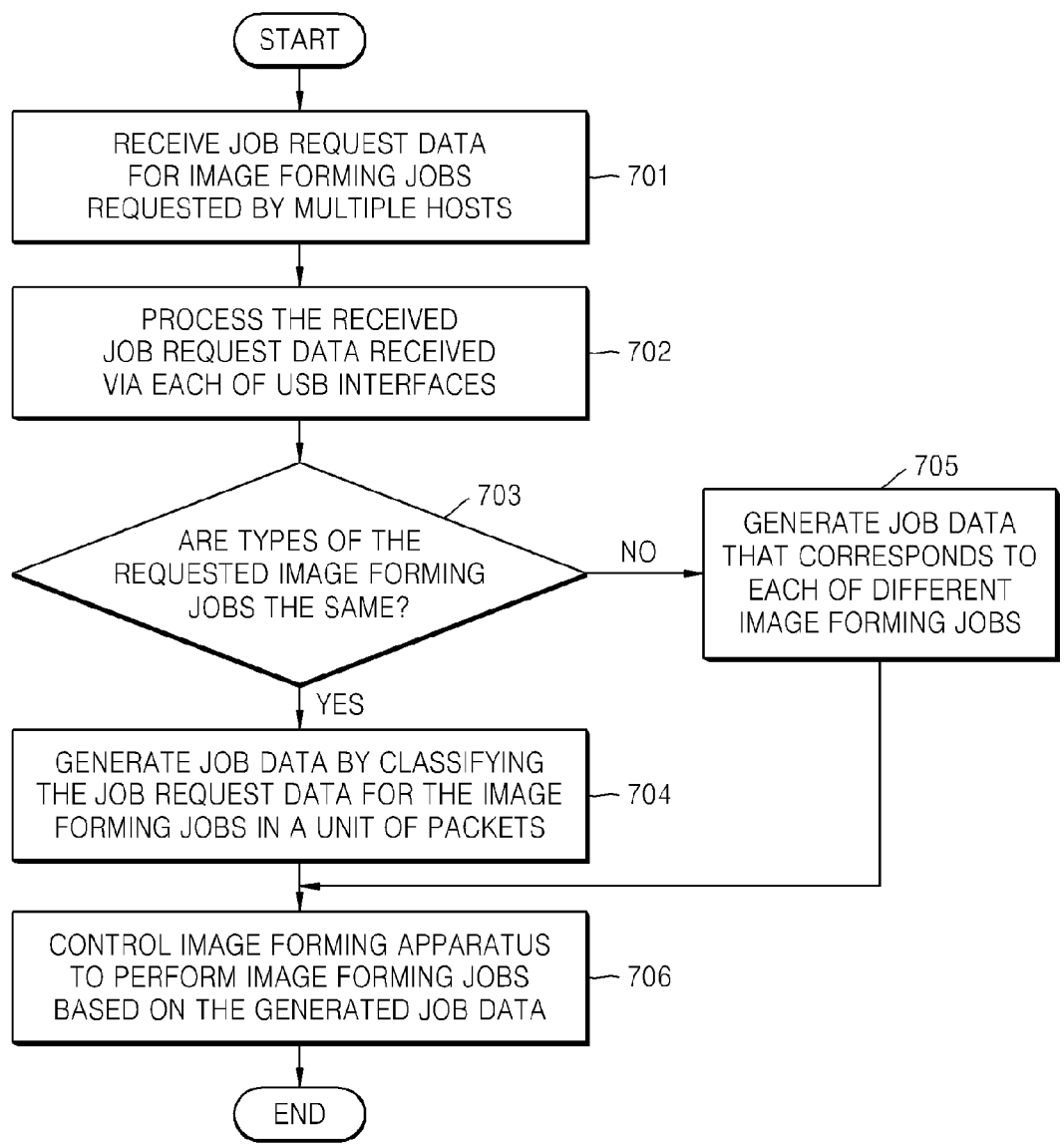

IMAGE FORMING APPARATUS CONNECTABLE TO MULTIPLE HOSTS AND METHOD OF CONTROLLING IMAGE FORMING JOBS OF THE IMAGE FORMING APPARATUS

CROSS-REFERENCE TO RELATED APPLICATIONS

This application claims the priority benefit of Korean Patent Application No. 10-2011-0147435, filed on Dec. 30, 2011, in the Korean Intellectual Property Office, the disclosure of which is incorporated herein in its entirety by reference.

BACKGROUND

1. Field

The following description relates to an image forming apparatus and a method of controlling image forming jobs of the image forming apparatus.

2. Description of the Related Art

A universal serial bus (USB) host exists at the center of a connection structure of a USB system, and the USB host communicates data with multiple USB devices connected thereto. Generally, the data communication is defined under a USB communication protocol.

Conventional USB devices can only be connected to a single host device. For example, in a case of personal computers (PCs) and printers, printers can be connected to only a single PC via their USB interface. In other words, a PC can be connected to multiple printers, but a printer cannot be shared among multiple PCs via its USB interface. Generally, in order to connect multiple host devices, such as PCs, to an image forming apparatus, such as a printer, for example, a network environment has to be configured. That is, multiple host devices can connect to an image forming apparatus via a network interface, such as Ethernet or a wireless local area network (LAN) card, for example. Additionally, to use a single image forming apparatus, multiple host devices generally use, for example, a router to be connected to the image forming apparatus. However, even with a router, it is not common for multiple host devices to use one image forming apparatus simultaneously.

SUMMARY

Additional aspects and/or advantages will be set forth in part in the description which follows and, in part, will be apparent from the description, or may be learned by practice of the invention.

The following description relates to an image forming apparatus and a method of controlling image forming jobs of the image forming apparatus.

According to an aspect of the disclosure, an image forming apparatus connectable to multiple hosts may include a plurality of USB interfaces to connect with the respective multiple hosts to receive job request data for image forming jobs requested by the multiple hosts; a driver module to process the job request data received via the respective multiple USB interfaces; a USB data manager to generate job data that corresponds to each of types of the requested image forming jobs by using the processed job request data; and a main controller to control the image forming apparatus to perform the image forming jobs based on the generated job data.

The USB data manager may generate the job data by processing the job request data requested by the multiple hosts together.

The USB data manager may generate the job data by classifying the job request data for image forming jobs in a unit of packets.

The USB data manager may generate the job data corresponding to each of the types in a request order of the image forming jobs from the multiple hosts.

The USB data manager may include a determining unit to determine the types of the requested image forming jobs; and a data generating unit to generate the job data corresponding to each of the types based on the determination result.

The apparatus may further include a buffer unit to store and read the job request data processed in the USB driver module, wherein the buffer unit is connected to the USB driver module and performs storage and read-out functions with respect to the job request data.

The main controller may control the image forming apparatus to perform the image forming jobs in parallel by using the job data generated for each of the types.

The USB driver module may control the USB interfaces to forward job result data that represents results of performing the image forming jobs to the hosts, the receiving of the job request data and the transmitting of the job result data being performed in parallel.

According to an aspect of the disclosure, a method of controlling image forming jobs in an image forming apparatus may include receiving job request data for image forming jobs requested by hosts via multiple USB interfaces to connect with the respective multiple hosts; processing, by a USB driver module, the job request data received via the multiple USB interfaces; generating job data that corresponds to each of types of the requested image forming jobs by using the processed job request data; and controlling the image forming apparatus to perform the image forming jobs based on the generated job data.

The generating of the job data may generate the job data by processing the job request data requested by the multiple hosts together.

The generating of the job data may generate the job data by classifying the job request data for image forming jobs in a unit of packets.

The generating of the job data may generate the job data corresponding to each of the types in a request order of the image forming jobs from the multiple hosts.

The generating of the job data may include determining types of the requested image forming jobs; and generating the job data corresponding to each of the types based on the determination result.

The method may further include storing, in a buffer unit, the job request data processed in the USB driver module, wherein the buffer unit is connected to the USB driver module and performs the storage operation.

The controlling of the image forming apparatus may include controlling the image forming apparatus to perform the image forming jobs in parallel by using the job data generated for each of the types.

The method may further include controlling the USB interfaces to forward job result data that represents results of performing the image forming jobs to the hosts, the receiving of the job request data and the transmitting of the job result data being performed in parallel.

According to an aspect of the disclosure, a non-transitory computer readable recording medium includes a program embodied thereon to perform the method, when executed by a computer.

According to an aspect of the disclosure, a method of processing multiple image forming jobs in an image forming apparatus includes receiving first job request data from a first host apparatus connected to the image forming apparatus via a first Universal Serial Bus (USB) interface; receiving second job request data from a second host apparatus connected to the image forming apparatus via a second USB interface; processing, by a USB driver module, the first job request data and the second job request data; generating a first job corresponding to the processed first job request data and a second job corresponding to the processed second job request data; and controlling the image forming apparatus to perform the first and second jobs in parallel based on the generated first and second jobs.

BRIEF DESCRIPTION OF THE DRAWINGS

The above and other features and advantages of the disclosure will become more apparent by describing in detail exemplary embodiments thereof with reference to the attached drawings in which:

FIG. 2A is a detailed block diagram of the image forming apparatus, according to an embodiment;

FIG. 7 is a detailed flowchart of a method of controlling image forming jobs performed by the image forming apparatus, according to an embodiment.

DETAILED DESCRIPTION

The disclosure will now be described more fully with reference to the accompanying drawings, in which exemplary embodiments are shown.

Figure 1A:
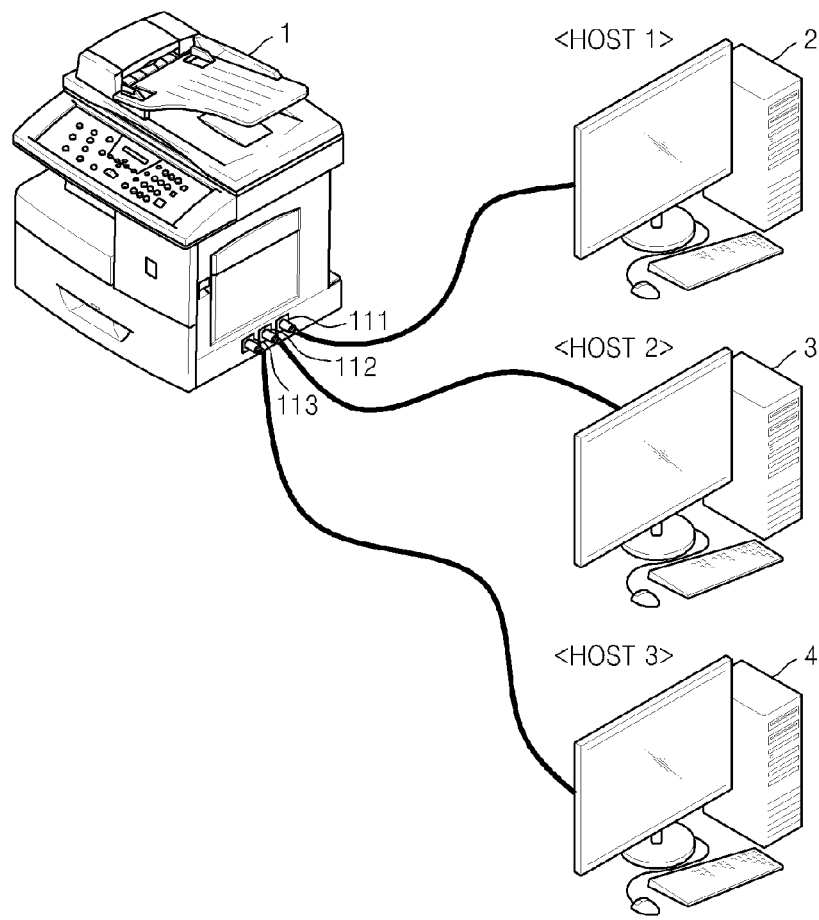
FIG. 1A is a block diagram of an image forming system, according to an embodiment.

FIG. 1A is a block diagram of an image forming system, according to an embodiment. Referring to FIG. 1A, the image forming system includes an image forming apparatus 1, a first host 2, a second host 3, and a third host 4.

The image forming apparatus 1 includes a general multi-function peripheral (MFP) device that supports at least one form of image forming jobs, such as printing, copying, faxing, scanning, or e-mailing, for example. A case where the image forming apparatus 1 is an MFP device will be described below. However, the image forming apparatus 1 is not limited thereto, and may be any of printers, scanners, or facsimiles, for example, or a device capable of performing at least two image forming jobs.

The image forming apparatus 1 includes multiple universal serial bus (USB) interfaces 111, 112, and 113. Here, although there are only three USBs illustrated, the image forming apparatus is not limited thereto and may be modified otherwise. For example, the image forming apparatus 1 may include two, three, four, or more USB interfaces.

The first, second, and third hosts 2, 3, and 4 are connected to the USB interfaces 111, 112, and 113, respectively. Here, the hosts 2, 3, and 4 include devices, such as computers, laptops, or portable terminals, for example, which are able to connect to the image forming apparatus 1 via the USB interfaces.

Generally, conventional USB devices have been allowed to connect to only one host device. For example, a conventional printer can be generally equipped with only one USB interface and thus connected to only one personal computer (PC). In other words, one PC can connect to multiple printers, but one printer cannot be shared among multiple PCs via its USB interface.

With development of network environments, multiple PCs have been allowed to connect to one printer via wired/wireless networks. In other words, one printer can connect to multiple PCs via wired/wireless network interfaces installed in the printer.

However, in a situation where wired/wireless network environments are not developed, multiple PCs cannot be connected to and share one printer. In particular, a conventional image forming apparatus, such as a printer, cannot be shared among multiple PCs with its USB interface. Even if a conventional image forming apparatus is equipped with multiple USB interfaces, multiple PCs can only take turns using the image forming apparatus, and not simultaneously control image forming jobs of the image forming apparatus.

However, the image forming apparatus 1 allows the multiple hosts 2, 3, and 4 to share and use the one image forming apparatus 1 with the multiple USB interfaces 111, 112, and 113, even in a situation where no network environments are configured. In addition, even if the multiple hosts 2, 3, and 4 simultaneously request the one image forming apparatus 1 for image forming jobs, the image forming apparatus 1 can perform the requested image forming jobs without a delay, and thus decrease the time for completing all the image forming jobs.

Functions and jobs of the image forming apparatus 1 will be described below in more detail.

Figure 1B:
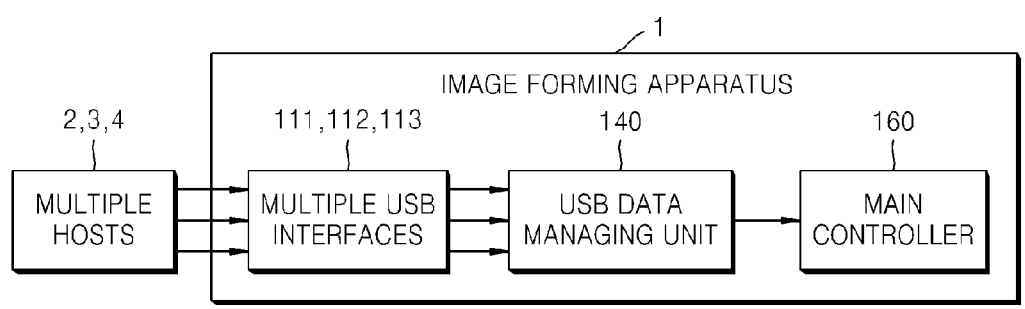
FIG. 1B is a block diagram of an image forming apparatus, according to an embodiment.

FIG. 1B is a block diagram of the image forming apparatus 1, according to an embodiment. Referring to FIG. 1B, the image forming apparatus 1 includes the multiple USB interfaces 111, 112, and 113 able to connect to the multiple hosts 2, 3, and 4, a USB manager 140, and a main controller 160.

To avoid obscuring features of the disclosure, some components of the image forming apparatus 1 are omitted. Further, it would be appreciated by one of ordinary skill in the art that universal components other than those illustrated in FIG. 1B can further be included.

FIG. 2A is a detailed block diagram of the image forming apparatus 1, according to an embodiment. Referring to FIG. 2A, the image forming apparatus 1 includes a first USB interface 111, a second USB interface 112, a third USB interface 113, a first USB driver module 121, a second USB driver module 122, a third USB driver module 123, a first buffer 131, a second buffer 132, a third buffer 133, the USB data manager 140, a memory unit 150, a main controller 160, a print unit 171, a scan unit 172, a copy unit 173, a network interface 174, a user interface 175, and a fax unit 176.

Figure 2B:
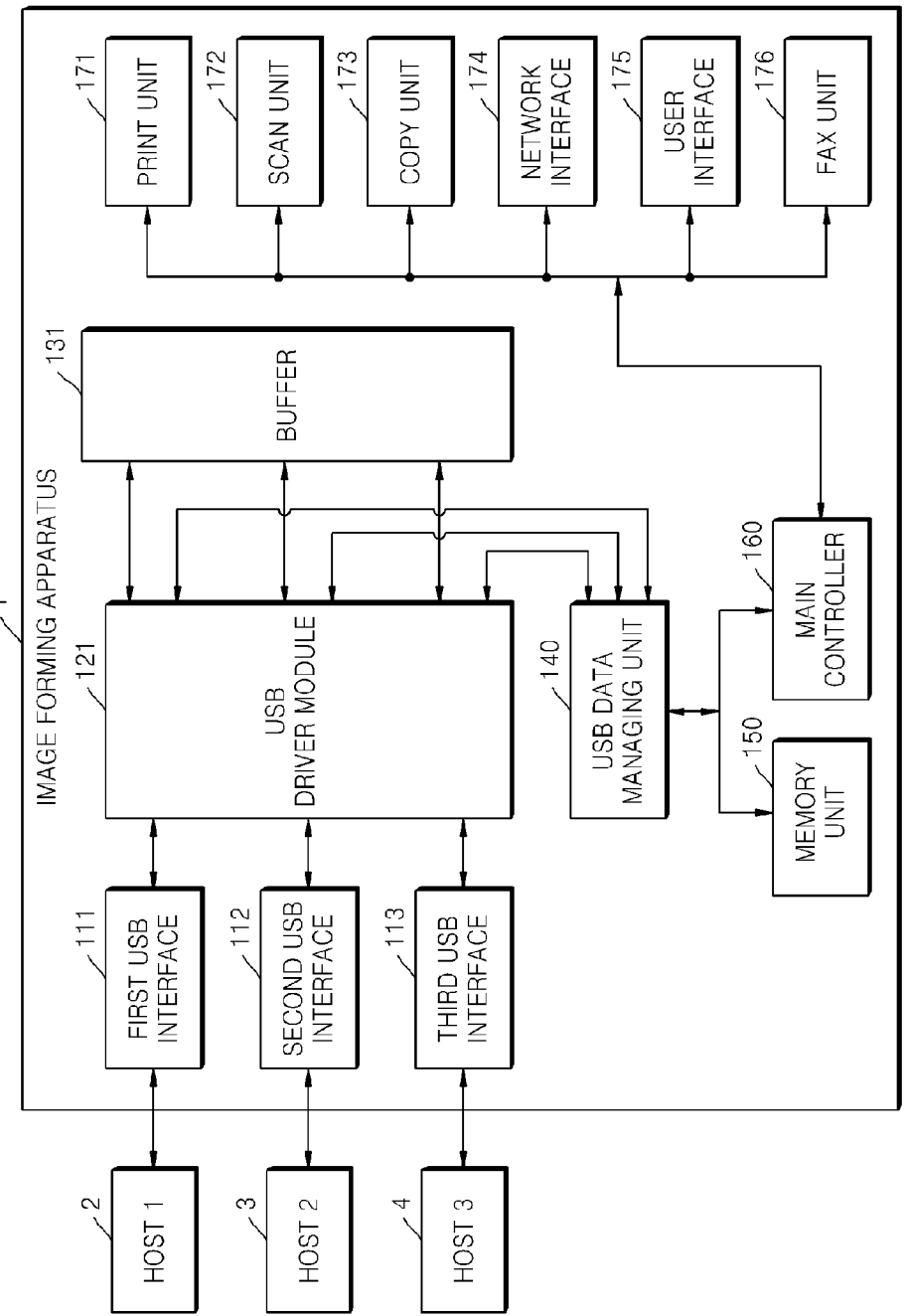
FIG. 2B is a detailed block diagram of the image forming apparatus, according to an embodiment.

FIG. 2B is a detailed block diagram of the image forming apparatus 1, according to an embodiment. The image forming apparatus 1 may include a single integrated USB driver module connected to each of USB interfaces 111, 112, and 113 that performs the same function as the three separate USB driver modules illustrated in FIG. 2A perform together. Similarly, the image forming apparatus 1 may include a single integrated buffer that performs the same function as the three separate buffers illustrated in FIG. 2A perform together.

In FIG. 2A, the USB driver modules 121, 122, and 123, the USB manager 140, and the main controller 160 correspond to types of processors. Accordingly, they may be implemented in arrays of numerous logic gates or in a combination of a universal microprocessor and a memory having programs stored therein executable by the microprocessor. Further, it would be appreciated by one of ordinary skill in the art that they may be implemented in other types of hardware.

The image forming apparatus 1 performs various image forming jobs, such as a print job using the print unit 171, a scanning job using the scan unit 172, a copying job using the copy unit 173, an emailing job using the network interface 174, or a faxing job using the fax unit 176, for example. Such image forming jobs may be performed at the request of hosts 2, 3, or 4.

As discussed above, the image forming apparatus 1 is equipped with multiple USB interfaces 111, 112, and 113, each of which is connected to the multiple hosts 2, 3, and 4, respectively. For example, the first host 2 may be connected to the first USB interface 111, the second host 3 may be connected to the second USB interface 112, and the third host 4 may be connected to the third USB interface 113.

As such, the multiple USB interfaces 111, 112, and 113 are respectively connected to the multiple hosts 2, 3, and 4 and receive job request data for requested image forming jobs. The image forming jobs may be classified into printing, copying, scanning, or emailing, for example, as described above.

For example, the first USB interface 111 connected to the first host 2 may receive job request data for a printing job from the first host 2, and the second USB interface 112 connected to the second host 3 may receive job request data for a scanning job. In another example, the first and second hosts 2 and 3 may request the same printing job.

The multiple USB driver modules 121, 122, and 123 handle job request data respectively received via the USB interfaces 111, 112, and 113. More specifically, the USB driver modules 121, 122, and 123 refer to program modules responsible for interfacing between the image forming apparatus 1 and the hosts 2, 3, and 4, controlling data transmit/receive jobs of the USB interfaces 111, 112, and 113, analyzing data received at the USB interfaces 111, 112, and 113, or providing data for transmission via the USB interfaces 111, 112, and 113.

Here, the USB driver modules 121, 121, and 122 are equipped to correspond to the USB interfaces 111, 112, and 113, respectively.

The multiple buffer units 131, 132, and 133 conduct a general buffer function of temporarily storing and reading out job request data handled by each of the USB driver modules 121, 122, and 123. The buffer units 131, 132, and 133 may store and read out the job request data handled by each of the USB driver modules 131, 132, and 133 in packets. Each of the buffer units 131, 132, and 133 is connected to each of the USB driver modules 121, 122, and 123 and performs storage and read-out functions with respect to the job request data.

The USB data manager 140 generates job data that corresponds to each of types of image forming jobs requested by the hosts 2, 3, and 4 by using handled request data. The USB data manager 140 generates job data by handling all the job request data requested by the multiple hosts 2, 3, and 4.

For example, if the first host 2 requests a printing job, the second host 3 requests a printing job, and the third host 4 requests a scanning job, the USB data manager 140 handles all job request data for the requested printing jobs and the scanning job together.

More specifically, the USB data manager 140 generates job data by classifying job request data for image forming jobs in a unit of packets. In this example, both of the first and second hosts 2 and 3 request printing jobs. That is, the first and second hosts 2 and 3 request image forming jobs of the same kind. Accordingly, the USB data manager 140 generates job data by classifying job request data for the printing jobs requested by the first and second hosts 2 and 3 in packets and handling them together.

On the other hand, because the third host 4 requests a scanning job, the USB manager 140 generates separate job data for job request data for the scanning job requested by the third host 4, which is different from job data for a printing job.

This will be described in more detail with reference to FIGS. 3 and 4.

The USB data manager 140 generates job data corresponding to each of job types, based on a request order for image forming jobs from each of the hosts 2, 3, and 4. Specifically, when the same printing job is requested by the first host 2 and then by the second host 3, the USB data manager 140 generates job data such that job request data for the printing job requested by the first host 2 is printed ahead of job request data for the printing job requested by the second host 3.

Figure 2C:
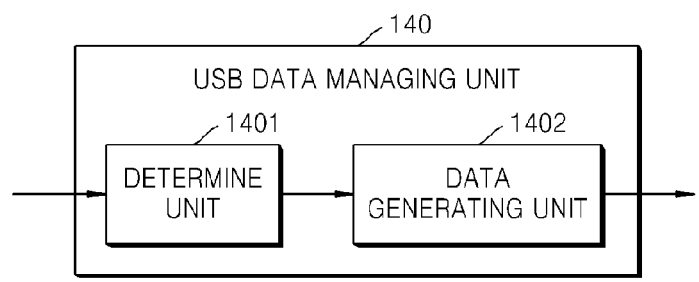
FIG. 2C is a detailed block diagram of a USB data manager, according to an embodiment.

FIG. 2C is a detailed block diagram of the USB data manager 140, according to an embodiment. Referring to FIG. 2C, the USB data manager 140 includes a determining unit 1401 and a data generating unit 1402.

The determining unit 1401 determines types of image forming jobs requested by each of the hosts 2, 3, and 4. That is, the determining unit 1401 determines whether a requested image forming operation type is printing, scanning, copying, faxing, or emailing jobs of the image forming apparatus 1.

The data generating unit 1402 generates job data that corresponds to a respective type of job, based on the result of the determination. Specifically, the data generating unit 1402 generates job data for printing jobs, for example, when the first and the second hosts 2 and 3 request printing jobs. It also generates job data for a scanning job, for example, when the third host 4 requests a scanning job. At this time, when image forming jobs of the same kind are requested by the different hosts 2 and 3, the data generating unit 1402 may generate job data by classifying job request data for the printing jobs in packets.

Referring to FIG. 2A, the main controller 160 controls the image forming apparatus 1 so that image forming jobs are performed based on generated job data.

The main controller 160 plays a central role in controlling overall functions of the image forming apparatus 1. Specifically, the main controller 160 may control all elements within the image forming apparatus 1, such as the print unit 171, the scan unit 172, the copy unit 173, the network interface 174, the user interface 175, and the fax unit 176, for example.

The main controller 160 uses job data generated for every type of image forming job to control the image forming apparatus 1 to perform the image forming jobs in parallel.

More specifically, the main controller 2 controls the image forming apparatus 1 such that the image forming apparatus 1 performs an image forming job requested by the second host 3 while communicating with the first host 2 through the first USB interface 111.

In other words, even though different image forming jobs are requested at different points in time or at the same time by the hosts 2, 3, and 4 connected to the USB interfaces 111, 112, and 113, respectively, the main controller 160 may simultaneously perform the requested image forming jobs in parallel.

The USB driver modules 121, 122, and 123 may control the USB interfaces 111, 112, and 113 to forward job result data that represents results of performing image forming jobs to the hosts 2, 3, and 4. That is, the USB driver modules 121, 122, and 123 control both data transmission and reception of the USB interfaces 111, 112, and 113.

The USB driver modules 121, 122, and 123 each control data transmission/reception via the respective USB interfaces 111, 112, and 113 connected to the hosts 2, 3, and 4. Here, the USB driver modules 121, 122, and 123 independently control the data transmission and reception of the USB interfaces 111, 112 and 113.

More specifically, even when receiving job request data from the first host 2, the first USB interface 111 is also able to transmit job result data that represents results of performing an image forming job to the second host 3 via the second USB interface 112. The USB driver modules 121, 122, and 123 respectively control two-way communications of the USB interfaces 111, 112, and 113 in parallel.

The memory unit 150 stores all processed results of the image forming apparatus 1 and reads them out to a requesting device. For example, the memory unit 150 may store, for example, processed results of image forming jobs or control results of the main controller 160.

Figure 3:
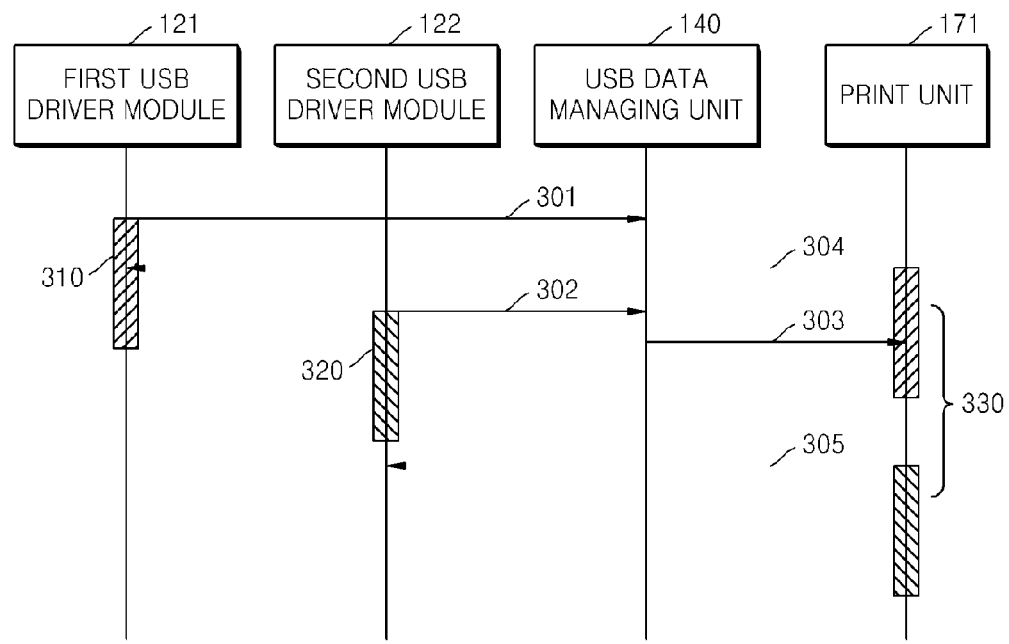
FIG. 3 is a diagram for illustrating a procedure of the image forming apparatus of performing image forming jobs of the same kind requested from multiple hosts connected thereto via USB interfaces, according to an embodiment.

FIG. 3 is a diagram for illustrating a procedure of the image forming apparatus 1 of performing image forming jobs of the same kind requested from the multiple hosts 2 and 3 connected thereto via the USB interfaces 111 and 112, according to an embodiment. In FIG. 3, the image forming jobs of the same kind are used as an example, but the disclosure is not limited thereto.

In operation 301, the first USB driver module 121 handles first job request data 310 for a printing job of the first host 2 received via the first USB interface 111. At this time, the first USB driver module 121 may process the first job request data 310 in packets, with each packet being a predetermined size.

Then, the USB data manager 140 receives the processed first job request data 310.

In operation 302, the second USB driver module 122 handles second job request data 320 for a printing job of the second host 3 received via the second USB interface 112. At this time, the second USB driver module 122 may process the second job request data 320 in packets, with each packet being a predetermined size.

Then, the USB data manager 140 receives the processed second job request data 320.

In operation 303, the USB data manager 140 classifies the received first and second job request data 310 and 320 in packets to generate job data 330.

Then, the USB data manager 140 transmits the generated job data 330 to the print unit 171 for performing the printing jobs.

In operation 304, the print unit 171 transmits to the first USB driver module 121 information indicating the print unit 171 is performing the print job of the first host 2. The first host 2 may recognize from the transmitted information that printing is in progress.

In operation 305, the print unit 171 transmits to the second USB driver module 122 information indicating the print unit 171 is performing the print job of the second host 3. The second host 3 may recognize from the transmitted information that printing is in progress.

Referring to FIG. 3, even though the same types of printing jobs are requested from the hosts 2 and 3 connected to the respective USB interfaces 111 and 112 at the same time or at different times, data of each printing job is processed in packets instead of sequentially handling the printing jobs. Consequently, the image forming apparatus is able to perform the printing jobs faster.

Figure 4:
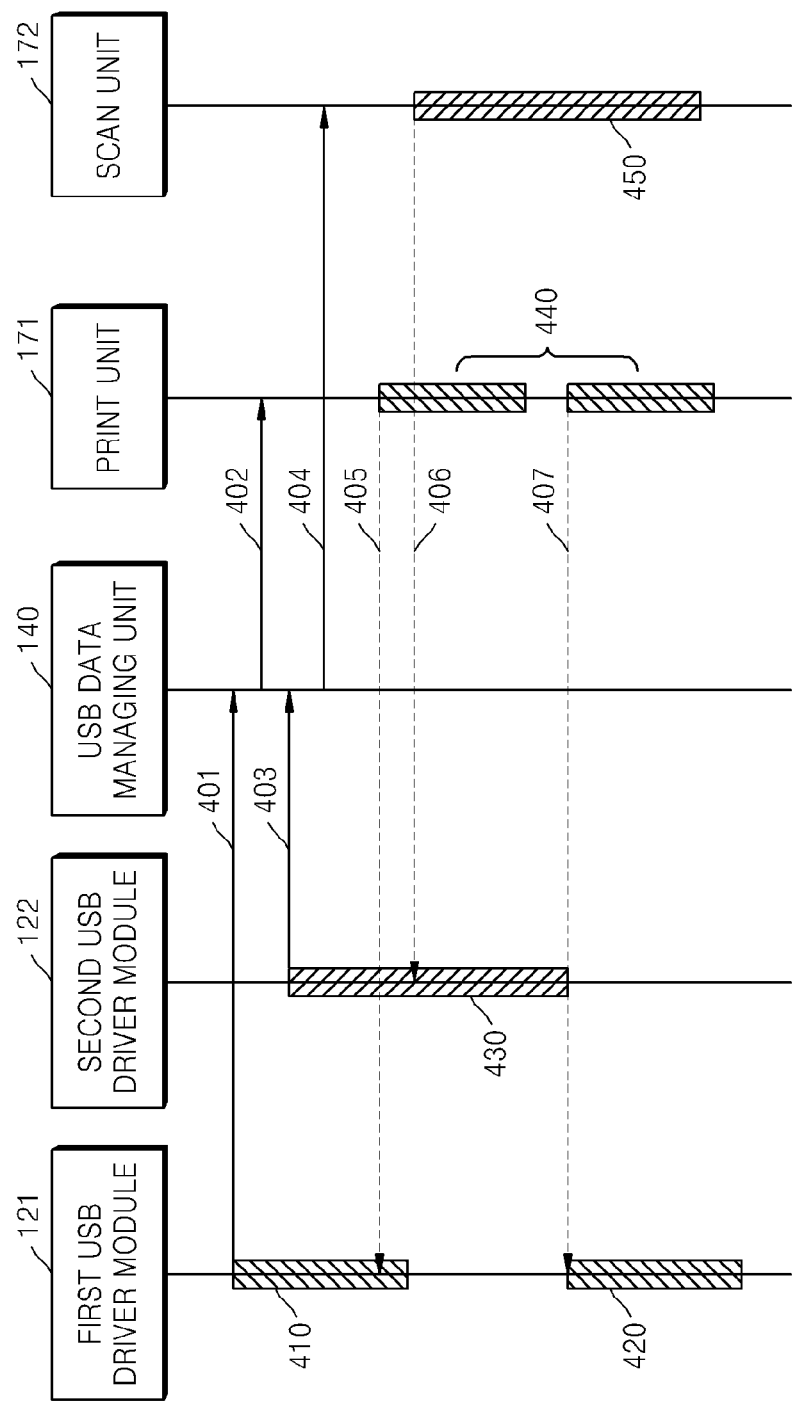
FIG. 4 is a diagram for illustrating a procedure of the image forming apparatus of performing different kinds of image forming jobs requested from multiple hosts connected thereto via USB interfaces, according to an embodiment.

FIG. 4 is a diagram for illustrating a procedure at the image forming apparatus 1 of performing different types of image forming jobs requested from the multiple hosts 2 and 3 connected thereto via the USB interfaces 111 and 112, according to an embodiment.

Unlike FIG. 3, FIG. 4 is a diagram for a case where different types of image forming jobs are requested from the hosts 2 and 3. In FIG. 4, an embodiment where the first host 2 requests a printing job while the second host 3 requests a scanning job will be described as an example, but embodiments are not limited thereto.

In operation 401, the first USB driver module 121 handles first job request data 410 and second job request data 420 for the printing job of the first host 2 received via the first USB interface 111. At this time, the first USB driver module 121 may process the first job request data 410 and the second job request data 420 in packets, with each packet being a predetermined size.

Then, the USB data manager 140 receives the processed first and second job request data 410 and 420.

In operation 402, the USB data manager 140 classifies the received first and second job request data 410 and 420 in packets to generate first job data 440 for the printing job.

Then, the USB data manager 140 transmits the generated first job data 440 to the print unit 171 for performing the printing job.

In operation 403, the second USB driver module 122 handles third job request data 430 for the scanning job of the second host 3 received via the second USB interface 112. At this time, the second USB driver module 122 may process the third job request data 320 in packets, with each packet being a predetermined size.

Then, the USB data manager 140 receives the processed third job request data 430.

In operation 404, the USB data manager 140 classifies the received third job request data 430 in packets to generate second job data 450 for the scanning job.

Then, the USB data manager 140 transmits the generated second job data 450 to the scan unit 172 for performing the scanning job.

In operation 405, the print unit 171 transmits to the first USB driver module 121 information indicating the print unit 171 is performing the printing job regarding the first job request data 410. The first host 2 may recognize from the transmitted information that printing is in progress.

In operation 406, the scan unit 172 transmits to the second USB driver module 122 information indicating the scan unit 172 is performing the scanning job regarding the third job request data 430. The second host 3 may recognize from the transmitted information that scanning is in progress.

In operation 407, the print unit 171 transmits to the first USB driver module 121 information indicating the print unit 171 is performing the printing job regarding the second job request data 420. The first host 2 may recognize from the transmitted information that printing is in progress.

Referring to FIG. 4, even though different image forming jobs are requested at different points in time or at the same time by the hosts 2 and 3 connected to the respective USB interfaces 111 and 112, the requested image forming jobs may be performed simultaneously in parallel.

Figure 5:
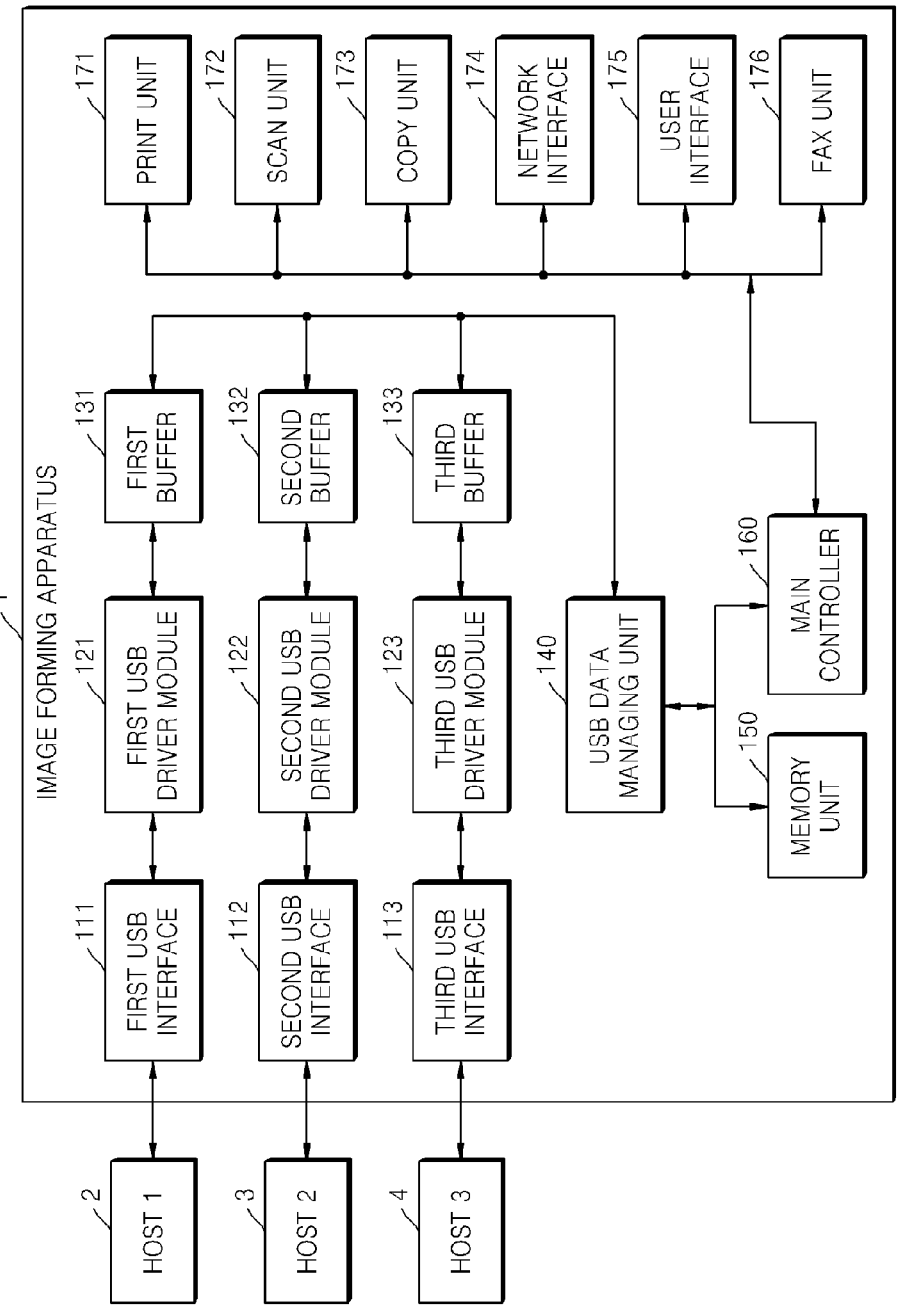
FIG. 5 is a detailed block diagram of the image forming apparatus, according to an embodiment.

FIG. 5 is a detailed block diagram of the image forming apparatus 1, according to an embodiment.

Compared with the apparatus 1 shown in FIG. 2A, most of functions and operations of the apparatus 1 of FIG. 5 are the same, except that in the latter case, the USB data manager 140 directly transmits/receives data to/from the multiple buffers 131, 132, and 133. Accordingly, a detailed description of the apparatus 1 of FIG. 5 will be omitted.

Figure 6:
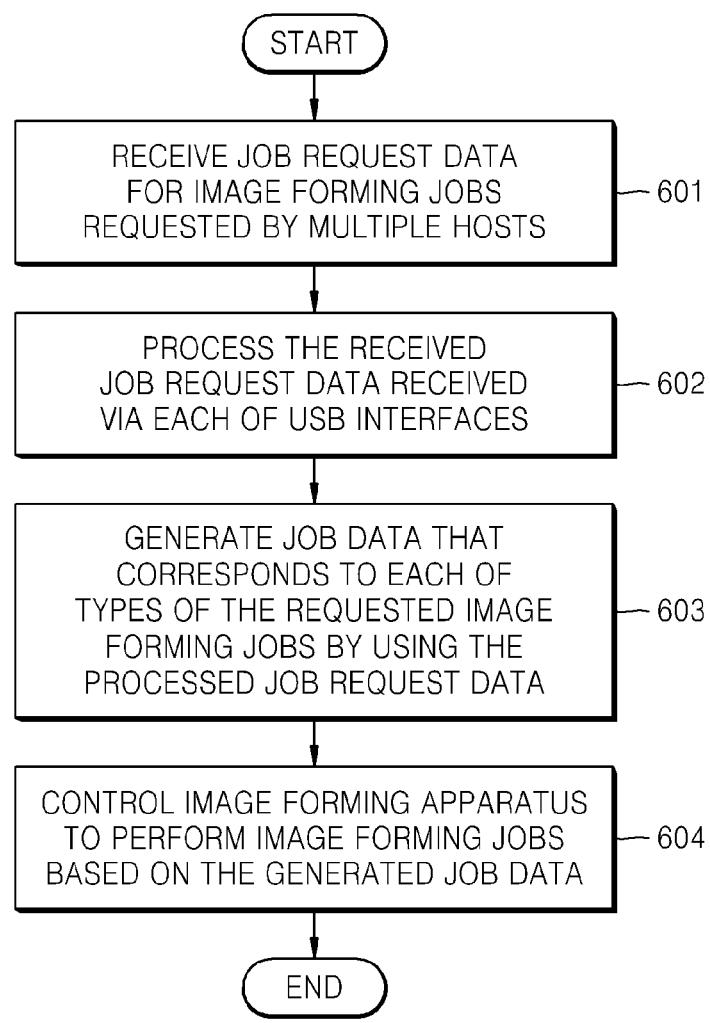
FIG. 6 is a flowchart of a method of controlling image forming jobs performed by the image forming apparatus, according to an embodiment.

FIG. 6 is a flowchart of a method of controlling image forming jobs in the image forming apparatus 1, according to an embodiment. Referring to FIG. 6, the method consists of operations to be processed in time series in the image forming apparatus 1 as shown in FIG. 2A, FIG. 2B, or FIG. 5. Thus, the description of the drawings applies to the method of controlling image forming jobs according to the present embodiment.

In operation 601, the multiple USB interfaces 111, 112, and 113 receive job request data for image forming jobs requested by the multiple hosts 2, 3, and 4.

In operation 602, the multiple USB driver modules 121, 121, and 122 processes the job request data received via the respective USB interfaces 111, 112, and 113.

In operation 603, the USB data manager 140 generates job data that corresponds to each type of the image forming jobs by using the processed job request data.

In operation 604, the main controller 160 controls the image forming apparatus 1 to perform the image forming jobs based on the generated job data.

FIG. 7 is a detailed flowchart of a method of controlling image forming jobs performed by the image forming apparatus 1, according to an embodiment.

In operation 701, the multiple USB interfaces 111, 112, and 113 receive job request data for image forming jobs requested by the multiple hosts 2, 3, and 4.

In operation 702, the multiple USB driver modules 121, 121, and 122 process the job request data received via the respective USB interfaces 111, 112, and 113.

In operation 703, the determining unit 1401 determines types of the image forming jobs requested by the hosts 2, 3, and 4.

When the types are determined to be all the same, the data generating unit 1402 generates job data by classifying the job request data for the same image forming jobs in packets, in operation 704.

When the types are determined to be different from each other, the data generating unit 1402 generates job data that corresponds to each of the different image forming jobs, in operation 705.

In operation 706, the main controller 160 controls the image forming apparatus 1 to perform the image forming jobs based on the generated job data.

The image forming apparatus according to the present disclosure includes multiple USB interfaces to allow multiple hosts to share and use one image forming apparatus even in a situation where no network environment is configured. In addition, even if the multiple hosts simultaneously request the one image forming apparatus for image forming jobs, the image forming apparatus can perform the requested image forming jobs at the same time without a delay, and thus decrease the time for completing all the image forming jobs. Furthermore, the image forming apparatus is able to perform the image forming jobs while communicating with the multiple hosts in parallel.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. An image forming apparatus connectable to multiple hosts, the apparatus comprising:
   a plurality of Universal Serial Bus (USB) interfaces to couple with the respective multiple hosts to receive job request data for image forming jobs requested by the respective multiple hosts;
   a plurality of USB driver modules to process the job request data received via the respective multiple USB interfaces;
   a USB data manager to generate job data in parallel that corresponds to each of types of the requested image forming jobs by using the processed job request data; and
   a main controller to control the image forming apparatus to perform the image forming jobs in parallel based on the generated job data, such that the image forming apparatus performs at least a portion of the image forming jobs simultaneously.

2. The image forming apparatus of claim 1, wherein the USB data manager generates the job data by processing the job request data requested by the multiple hosts together.

3. The image forming apparatus of claim 1, wherein the USB data manager generates the job data by classifying the job request data for image forming jobs in a unit of packets.

4. The image forming apparatus of claim 1, wherein the USB data manager generates the job data corresponding to each of the types in a request order of the image forming jobs from the multiple hosts.

5. The image forming apparatus of claim 1, wherein the USB data manager comprises
   a determining unit to determine the types of the requested image forming jobs; and
   a data generating unit to generate the job data corresponding to each of the types based on the determination result.

6. The image forming apparatus of claim 1, further comprising
a buffer unit to store and read the job request data processed in each of the USB driver modules,
wherein the buffer unit is connected to the USB driver module and performs storage and read-out functions with respect to the job request data.

7. The image forming apparatus of claim 1, wherein the main controller controls the image forming apparatus to perform the image forming jobs in parallel by using the job data generated for each of the types.

8. The image forming apparatus of claim 1, wherein the USB driver module controls the USB interfaces to forward job result data that represents results of performing the image forming jobs to the hosts, the receiving of the job request data and the transmitting of the job result data being performed in parallel.

9. A method of controlling image forming jobs in an image forming apparatus, the method comprising:
receiving job request data for image forming jobs requested by hosts via multiple Universal Serial Bus (USB) interfaces to connect with the respective multiple hosts;
processing, by a plurality of USB driver modules, the job request data received via the multiple USB interfaces;
generating job data in parallel that corresponds to each of types of the requested image forming jobs by using the processed job request data; and
controlling the image forming apparatus to perform the image forming jobs in parallel based on the generated job data, such that the image forming apparatus performs at least a portion of the image forming jobs simultaneously.

10. The method of claim 9, wherein the generating of the job data generates the job data by processing the job request data requested by the multiple hosts together.

11. The method of claim 9, wherein the generating of the job data generates the job data by classifying the job request data for image forming jobs in a unit of packets.

12. The method of claim 9, wherein the generating of the job data generates the job data corresponding to each of the types in a request order of the image forming jobs from the multiple hosts.

13. The method of claim 9, wherein the generating of the job data comprises
determining types of the requested image forming jobs; and
generating the job data corresponding to each of the types based on the determination result.

14. The method of claim 9, further comprising
storing, in a buffer unit, the job request data processed in the USB driver module,
wherein the buffer unit is connected to the USB driver module and performs the storage operation.

15. The method of claim 9, wherein the controlling of the image forming apparatus comprises controlling the image forming apparatus to perform the image forming jobs in parallel by using the job data generated for each of the types.

16. The method of claim 9, further comprising
controlling the USB interfaces to forward job result data that represents results of performing the image forming jobs to the hosts, the receiving of the job request data and the transmitting of the job result data being performed in parallel.

17. A non-transitory computer readable recording medium having a program embodied thereon that performs, when executed by a computer, the method of claim 9.

18. The method of claim 9, wherein the performing the image forming jobs in parallel includes performing a scanning job while performing a printing job.

* * * * *